UNITED STATES PATENT OFFICE.

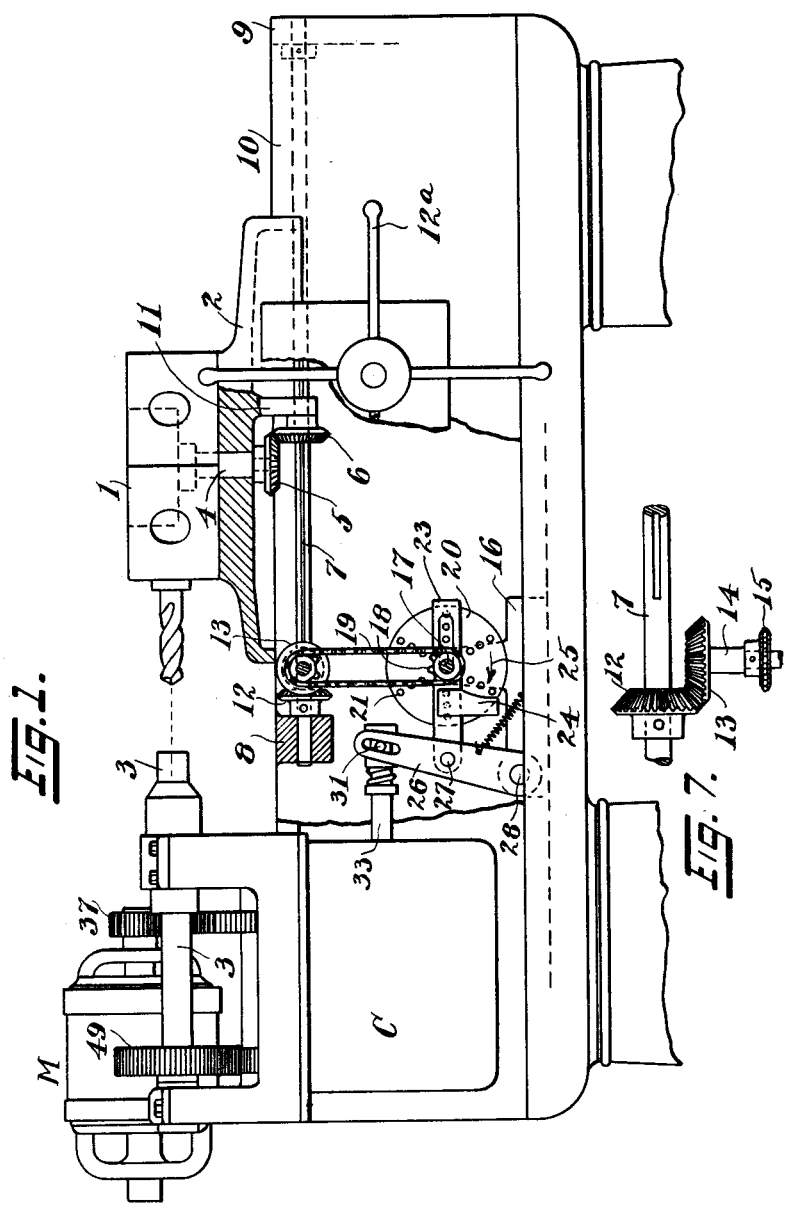

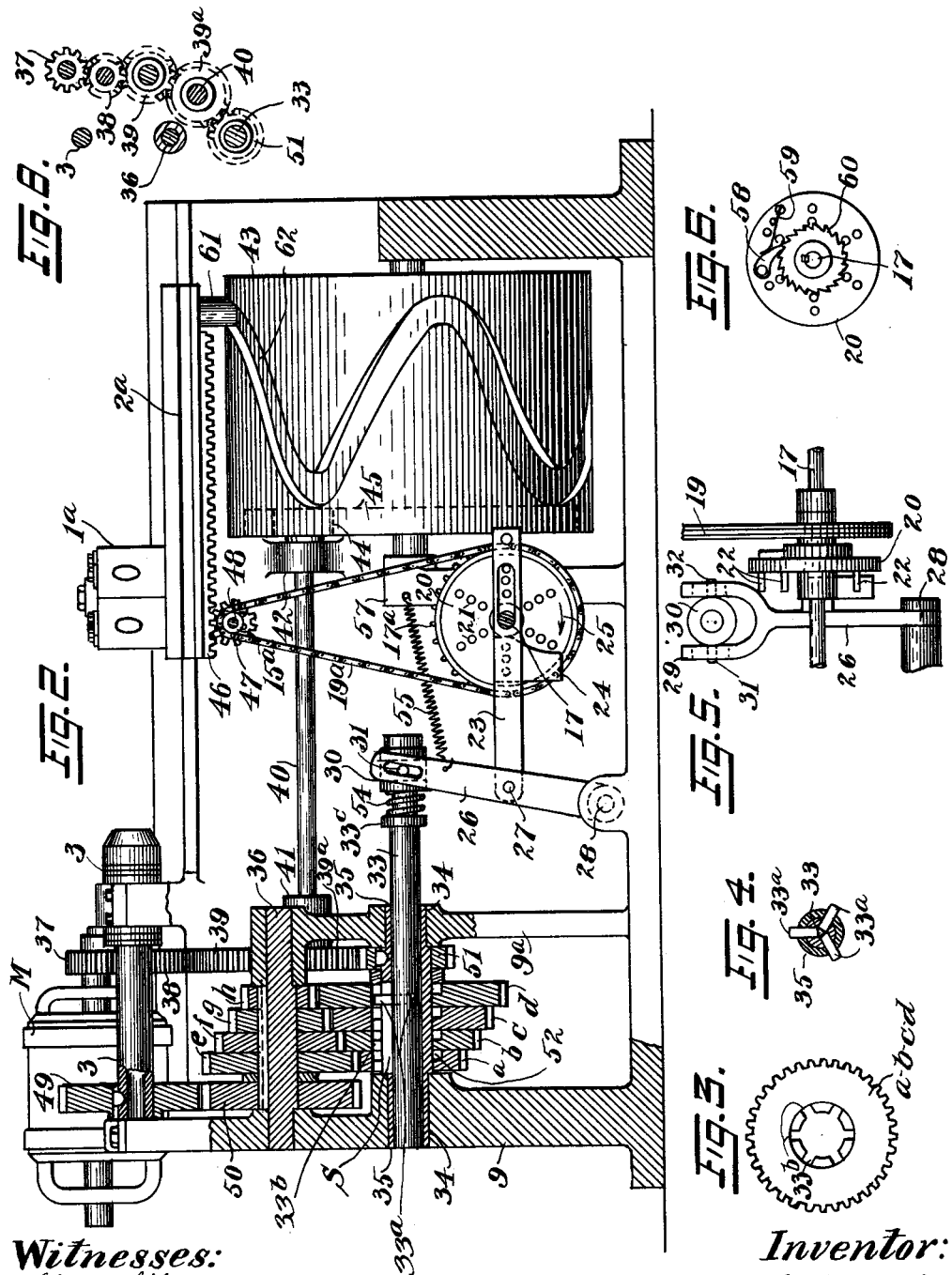

HERBERT KIENZLE, OF NEW YORK, N. Y.

MECHANICAL LATHE CONTROL.

1,157,227.    Specification of Letters Patent.    Patented Oct. 19, 1915.

Application filed June 4, 1914. Serial No. 842,826.

*To all whom it may concern:*

Be it known that I, HERBERT KIENZLE, a citizen of the United States, residing in New York city, in the county of New York and State of New York, have invented certain new and useful Improvements in Mechanical Lathe Control, of which the following is a specification.

My present invention relates to improvements in hand operated or automatic turret lathes and the like, and has for its object the automatic variation and control of the speeds of the work spindle in conjunction with a system of change gears in operative connection with the said work spindle.

The main feature of my improvement consists in changing the rotative speeds of the work during the various operations performed thereon by the various tools carried in the turret, so that each tool will have its cutting speed relative to the tool feed varied in such manner as to obtain the most efficient production of work, during the operation of said tool. As is well known drilling tools, box tools, reamers, formers, and shaving tools all require certain speeds in order to obtain their greatest efficiency and this improvement enables these changes of speeds to be made practically coincident with the entering of the tool into the working zone.

In the accompanying drawings, Figure 1 is a side elevation of a hand turret lathe with a section broken away showing parts of my improvement. Fig. 2 is a partial sectional view through an automatic turret lathe. Fig. 3 is a side elevation of one of the change speed gears. Fig. 4 is a transverse section of the sliding gear engaging shaft. Fig. 5 is a fragmentary end elevation of a gear-shift operating means. Fig. 6 is a side elevation of a ratchet mechanism utilized in said gear shift mechanism. Fig. 7 is a fragmentary plan view of a portion of the turret gear transmission, and Fig. 8 is a side elevation of the motor gear train.

In Fig. 1 there is shown the usual plural tool-holding turret 1 mounted on a turret slide 2, for advancing and retracting the tools to and from the work, and simultaneously presenting new tools to the work in the usual manner, the work being held in a constantly rotating work spindle 3. The turret 1 is fixedly attached to a pivot 4 which is rotatably mounted on the slide 2 and on the lower end of the pivot 4 is arranged a miter gear 5 which meshes with a sliding miter gear 6 splined to the shaft 7, which shaft is rotatably mounted in bearings 8 and 9 which are provided on the lathe bed 10.

The sliding miter gear 6 is rotatably supported in operative position with the turret slide 2 by means of a bearing 11 which is integral therewith so that when the slide is operated to and fro, by means of a handle 12$^a$, the gear is carried along the said shaft 7. This arrangement keeps both miters 6 and 5 in constant mesh in any position of longitudinal movement, and permits rotation of shaft 7 during said longitudinal movement. Any rotation of the shaft 7 is transmitted to another pair of miter or bevel gears 12 and 13 keyed to said shaft, said rotation being transmitted through the sprocket shaft 14 which is suitably supported on the bed of the lathe and upon one end of which shaft is arranged a chain sprocket 15. Immediately underneath the last noted chain sprocket there is arranged upon any suitable support, or the lathe bed, a bearing block 16 which has rotatable therein a shaft 17 and upon the said shaft is mounted a second chain sprocket 18. A chain 19 runs from the said sprocket 18 to the sprocket 15 so that rotary motion is transmitted therebetween. On the shaft 17 there is mounted a circular disk 20 which disk has arranged therein a plurality of equidistantly spaced rows of holes 21, there being as many rows of holes as there are tool holding faces in the turret; in the present instance 6.

There is detachably mounted in any selected hole in each of the foregoing noted plurality of rows of holes in the said cam disk 20, a cam pin 22 which is removably mounted so that in any given row of holes the pin may be set at a predetermined distance from the center so as to act as a gear lever thrust member or cam. Arranged on the shaft 17 is a slotted thrust rod 23, which has arranged near its central portion a cam-faced plate 24, which plate is maintained in the path of pins 22 so that when the disk 20 upon which they are carried is rotated in the direction of the arrow 25, the thrust lever 23 is caused to move forwardly under the impulse. The forward thrust of the member 23 is, of course, fixed by the distance the pin 22 is located from the center of the cam disk 20, and this advance is transmitted to a rock lever 26, which is pivoted at 27 to the said thrust lever 23, the said rock lever being itself pivoted for oscillation to the base of the machine at 28, as indicated in Fig. 2.

By referring to Fig. 5 it will be noted that the lever 26 has a forked end as at 29, and is in operative connection with a thrust collar 30 by means of pins 31 and 32, which operate in slots cut into the ends of the said forked lever. The thrust collar 30 is rotatably mounted upon a clutch shaft 33, Figs. 1 and 2, which shaft is mounted in bushing 35 of the frames 9 and 9ª, and is longitudinally movable therein in such a manner that when said lever 26 is rocked to and fro the shaft is free to simultaneously rotate. The bushing 35, which is mounted in the bearings 34, has loosely mounted for rotation thereon a plurality of varying diameter gears a, b, c and d, which gears are in mesh with corresponding varying gears e, f, g and h which are keyed to the rotatable shaft 36, which is mounted in the frames 9 and 9ª, Fig. 2, immediately above the first group of gears. The two sets of gears above noted are in constant mesh with one another and constitute, in the present instance, a change gear system which by means hereinafter described permit automatic selection of any pair of the said gears in order to transmit the desired speed ratios to the work spindle 3, as will now be described.

By referring to Figs. 1 and 2, it will be seen that there is mounted on the head-stock of the machine near the spindle 3, a source of power; in the present instance an electric motor M, which has arranged on its spindle a driving gear 37, Fig. 2, which driving gear meshes with a second gear 38 which in turn meshes with a third gear 39, and in mesh therewith a fourth gear 39ª, which last gear is mounted on the cam drum drive shaft 40. This last noted shaft is suitably mounted in bearings 41 and 42 conveniently located for rotatably supporting the said shaft. On the cam drum end of the shaft 40 there is arranged a gear 44 which in turn meshes with an internal gear 45, shown dotted, which is arranged upon the drum 43 so that when the motor M is rotated this rotation is transmitted through the train of gears 37 and 39 through the shaft 40 to the cam drum 43, thereby causing the said cam drum to rotate at a fixed predetermined speed relative to the motor. This movement of the cam drum causes reciprocation of the turret slide 2ª in the usual manner by means of the roll 61, attached to the rear end of the said slide, in operable connection with the cam groove 62.

The tool-carrying turret 1ª is caused to rotate, by the reciprocation of the turret slide 2ª, in the usual manner and by means not disclosed in the present drawings. At the bottom of the turret slide 2ª, Fig. 2, is arranged a rack 46 which meshes with a pinion 47 which is mounted upon a suitably supported shaft 48, which shaft also has thereon a sprocket 15ª and which sprocket transmits rotative motion to the cam disk 20 by means of a sprocket 17ª and a chain 19ª.

Having thus described the manner in which the turret slide is caused to selectively operate the gear shift mechanism indirectly from the motor M, I will now describe the manner of transmitting the various speeds selected to the work spindle 3. This is best delineated in Fig. 2, and it is to be understood that the same speed changing gear of the head-stock there shown is applied to the construction disclosed in Fig. 1, but which is inclosed by the casing C. At the rear end of the work spindle 3 there is keyed a gear 49, which gear in turn meshes with a second gear 50 which is keyed to the shaft 36 so that when the first group of change gears a, b, c and d are caused to rotate as selected, this rotation is transmitted through gears e, f, g or h, and this in turn causes the spindle to rotate through gears 50 and 49. For the purpose of causing the said shaft 33 to operate a selected gear there is keyed to the bushing 35 a gear 51, which gear is in constant driving engagement with the drum shaft gear 39, see also Fig. 8, so that continuous rotation of the motor is also transmitted to the bushing 35 as well as the drum shaft 40.

It is obvious from the foregoing description that the gears a, b, c and d are not positively connected to the driven bushing 35, but are rotatably mounted thereon. As a means for selecting and causing any one of the said gears a, b, c or d to become connected with the rotatable shaft 33 and bushing 35, there is arranged on the said shaft, Figs. 2 and 4, a plurality of dogs 33ª, which dogs are of such dimension as to be passed through a plurality of apertures 33ᵇ Figs. 2 and 3, which are cut in the centers of the gears a, b, c and d, and through longitudinal slots S which are cut in the cylindrical bushing 35, so that the said dogs 33ª will act as drivers when they are in interior engagement with the said gears. The selective engagement of the various gears is caused by the passage of the said dogs 33 from one gear to another into the position of engagement with the selected gear.

By referring to the section of the gears a, b, c and d, as indicated in Fig. 2, it will be noted that they have lugs 33ᵇ arranged therein, which lugs are only half the width of the gear, thus leaving clearances in the center thereof, as 52 in the gear a. This, therefore, makes the driving lugs 33ᵇ only half the width of the gear or as much less as is desirable, and it will also be noted that the driving dog 33ª on the shaft 33 as disclosed in the said section, is about equal to the width of the face of the lugs 33ᵇ. This construction is for the purpose of permitting the complete disengagement of the dogs 33ª which are integral with the shaft 33, with the prior engaged gear, before the next gear becomes engaged, thereby permitting engagement with only one of each of the said gears at one time. As a further precaution for safety in passing the said engagement shaft 33 to and fro in order to engage pre-determined gears, there is arranged at the clutch collar of the shaft 33 a shoulder 33ᶜ, which shoulder is integral with the said shaft 33 and against which rests a spring 54, the other end of which rests against the shoulder of a collar 30 which rotatably mounted on shaft 33, so that when motion is transmitted through the rocker arm 26, and should an obstruction, by reason of undue friction or from other causes, be met with by the dogs 33ª, the rocker arm can complete its full stroke and at the proper let-off point the shaft 33 will move forwardly disengaging one gear and engaging the next. On the return stroke of the engaging shaft 33 this resilient accommodation is taken up by the spring 55, which is connected between the said lever 26 and a suitable portion of the machine, such as the main drum shaft bearing 57.

In both types of machine disclosed in Figs. 1 and 2 it is necessary to provide additional means on the pin disk cams 20 so that when the turret slide is operated to and fro the pin disk cams are caused to operate at one part of the reciprocation of the slide. The selection and the direction of travel of the turret to and fro for causing operation of the said pin cam 20 is optional, but in the present instance I prefer to operate during the movement of the turret machine away from the work, which also includes the period when the turret is shifting the tools. One form of device that may answer for the purpose is disclosed in Fig. 6 wherein is shown the rear view of the pin cam 20, disclosing that the said pin cam has arranged at its back surface an oscillating pawl 58, which pawl is held in operative position by means of the customary rigidly held spring 59 bearing against its outer surface, the said pawl being in engagement with a ratchet wheel 60, which ratchet is in keyed engagement with the shaft 17, the said pin disk, however, being rotatably mounted on shaft 17. It is obvious, therefore, that when the shaft 17 is rotated in one direction the pawl will ride freely over the ratchet and cause no motion of the pin disk, but when the shaft is operated in the opposite direction the ratchet pawl causes the pin disk to operate.

The preferred method of operation of the present device is disclosed in Fig. 1, but reference may be had to Fig. 2 in describing certain portions of the mechanism that are common to both machines and are not shown in Fig. 1. When the hand wheel 12 is operated to move the turret slide backwardly near the end of the stroke the turret is caused to revolve bringing the next tool into operative position with the work spindle 3. This rotative motion of the turret causes the gear 5 to operate gear 6 which in turn causes the gears 12 and 13 to rotate, which rotation is transmitted through chain 19 to the sprocket 18 and this causes the pin cam 20 to rotate in the direction of the arrow 25. Accordingly as the pins 21 are set in any of the holes in the said plate 20, the rocker arm 26 is caused to move backward or forward and is held set in the operative position until the next movement of the turret or turret slide positions a pin in a new operative position. The remainder of the operation will be described from Fig. 2.

Upon operation of the rocker arm 26 the shaft 33 is caused to move through the loosely mounted gears $a$, $b$, $c$ and $d$, and the dogs 33ª engage with the members 33ᵇ on any one of the said last noted gears, the selection of which is entirely predetermined by the distance that any of the pins 21 are set away from the center of the pin disk 20. The gear thus selected is, of course, operatively keyed temporarily to the shaft 33 by means of the said dogs 33ª and is caused to rotate its respective meshing gear on shaft 36 and the ratio of speed thereby transmitted through gears 50 and 49 to the work spindle 3. Thus continuous rotary motion while being supplied to the other portions of the machine is automatically translated through the said change gearing and methods of operation in any ratios of speed, to the spindle without changing any of the other speeds.

What I claim is:

1. The combination in a power driven turret lathe with a reciprocating rotatable turret and a rotary spindle, of a series of stepped change-speed gears rigidly mounted on a rotatable shaft, a plurality of independently rotatable change-speed gears, both said sets of gears being constantly in mesh, a constantly rotating shaft arranged interiorly of said second set of gears, actuating means actuated by the movement of said turret, a first sprocket wheel operably connected to said actuating means, an auxiliary shaft, a second sprocket wheel on said auxiliary shaft, a sprocket chain connecting said first sprocket wheel with said second sprocket wheel, a cam wheel on said shaft, and means for connecting said cam wheel to intermittently rotate with said shaft, said second rotatable shaft being reciprocably mounted and connected with said cam wheel so as to be reciprocated, thereby to select any one of said change-speed gears and to lock them to said interior shaft.

2. The combination in a power driven turret lathe with a reciprocating rotatable turret and a rotary spindle, of a series of stepped change-speed gears rigidly mounted on a rotatable shaft, a plurality of independently rotatable change-speed gears, both said sets of gears being constantly in mesh, a constantly rotating shaft arranged interiorly of said second set of gears, actuating means actuated by the movement of said turret, a first sprocket wheel operably connected to said actuating means, an auxiliary shaft, a second sprocket wheel on said auxiliary shaft, a sprocket chain connecting said first sprocket wheel with said second sprocket wheel, a cam wheel on said shaft, means for connecting said cam wheel to intermittently rotate with said shaft pins on said cam wheel at various distances from the center, and along radial lines in the face of said cam wheel, a cam faced plate adapted to be engaged by said pins, said second rotatable shaft being reciprocably mounted, and means connecting said cam faced plate with said second rotatable shaft so as to reciprocate said second rotatable shaft, thereby to select any one of said change-speed gears and to lock them to said interior shaft.

3. The combination in a power driven turret lathe with a reciprocating rotatable turret and a rotary spindle, of a series of stepped change-speed gears rigidly mounted on a rotatable shaft, a plurality of independently rotatable change-speed gears, both said sets of gears being constantly in mesh, a constantly rotating shaft arranged interiorly of said second set of gears, actuating means actuated by the movement of said turret, a first sprocket wheel operably connected to said actuating means, an auxiliary shaft, a second sprocket wheel on said auxiliary shaft, a sprocket chain connecting said first sprocket wheel with said sprocket wheel, a cam wheel on said shaft, means for connecting said cam wheel to intermittently rotate with said shaft, pins on said cam wheel at various distances from the center, and along radial lines in the face of said cam wheel, a cam faced plate adapted to be engaged by said pins, a thrust rod on which said cam faced plate is secured, said second rotatable shaft being reciprocably mounted, and a link pivotally mounted and connecting said thrust rod with said second rotatable shaft so as to reciprocate said second rotatable shaft by the actuation of said cam wheel and thereby to select any one of said change-speed gears and to lock them to said interior shaft.

4. The combination in a power driven turret lathe with a reciprocating rotatable turret, a rotary spindle, and driving means for said rotatable spindle, of a change-speed mechanism connected to said driving means, actuating means operated by said turret, a first sprocket wheel actuated by said actuating means, an auxiliary shaft, a second sprocket wheel on said auxiliary shaft, a sprocket chain connecting said first sprocket wheel with said second sprocket wheel, a cam wheel on said shaft, and means for connecting said cam wheel to intermittently rotate with said shaft, said change-speed mechanism being connected with said cam wheel thereby to be actuated to change the speed of said driving means.

5. The combination in a power driven turret lathe with a reciprocating rotatable turret, a rotary spindle, driving means for said rotary spindle, of a change-speed mechanism connected to control the speed of said driving means, a cam wheel, and operable connections connecting said cam wheel with said turret thereby to actuate the cam wheel by the movement of said turret, said change-speed mechanism being connected with said cam wheel, thereby to be actuated to change the speed of said driving means.

6. The combination in a power driven turret lathe with a reciprocating rotatable turret, a rotary spindle, driving means for said rotary spindle, of a change-speed mechanism connected to control the speed of said driving means, a cam wheel, pins on said cam wheel at various distances from the center, and along radial lines in the face, of said cam wheel, a cam faced plate adapted to be engaged by said pins, and means connecting said cam faced plate with said change-speed mechanism, thereby to actuate said change-speed mechanism to change the speed of said driving means.

7. The combination in a power driven turret lathe with a reciprocating rotatable turret, a rotary spindle, driving means for said rotary spindle, of a change-speed mechanism connected to control the speed of said driving means, a cam wheel, pins on said cam wheel at various distances from the center, and along radial lines in the face, of said cam wheel, a cam faced plate adapted to be engaged by said pins, a thrust rod on which said cam faced plate is secured, and a link pivotally mounted and connecting said thrust rod with said change-speed mechanism whereby the actuation of said cam faced plate will actuate said change-speed mechanism to change the speed of said driving means.

8. The combination in a power driven turret lathe with a reciprocating rotatable turret and a rotary spindle, of a series of stepped change-speed gears rigidly mounted on a rotatable shaft, a plurality of independently rotatable change-speed gears, both said sets of gears being constantly in mesh, a constantly rotating shaft arranged interiorly of said second set of gears, a rack on said turret in the line of the path of movement of reciprocation of said turret, a spur gear in mesh with said rack, an auxiliary shaft, a sprocket wheel on said auxiliary shaft, a sprocket chain connecting said spur gear with said sprocket wheel, a cam wheel on said shaft, and means for connecting said cam wheel to rotate only when said turret is returning in its movement, said second rotatable shaft being reciprocably mounted and connected with said cam wheel so as to be reciprocated, thereby to select any one of said change-speed gears and to lock them to said interior shaft.

9. The combination in a power driven turret lathe with a reciprocating rotatable turret and a rotary spindle, of a series of stepped change-speed gears rigidly mounted on a rotatable shaft, a plurality of independently rotatable change-speed gears, both said sets of gears being constantly in mesh, a constantly rotating shaft arranged interiorly of said second set of gears, a rack on said turret in the line of the path of movement of reciprocation of said turret, a spur gear in mesh with said rack, an auxiliary shaft, a sprocket wheel on said auxiliary shaft, a sprocket chain connecting said spur gear with said sprocket wheel, a cam wheel on said shaft, pins on said cam wheel at various distances from the center, and along radial lines in the face, of said cam wheel, a cam faced plate adapted to be engaged by said pins, said second rotatable shaft being reciprocably mounted, and means connecting said cam faced plate with said second rotatable shaft so as to reciprocate said second rotatable shaft, thereby to select any one of said change-speed gears and to lock them to said interior shaft.

10. The combination in a power driven turret lathe with a reciprocating rotatable turret and a rotary spindle, of a series of stepped change-plate gears rigidly mounted on a rotatable shaft, a plurality of independently rotatable change-speed gears, both said sets of gears being constantly in mesh, a constantly rotating shaft arranged interiorly of said second set of gears, a rack on said turret in the line of the path of movement of reciprocation of said turret, a spur gear in mesh with said rack, an auxiliary shaft, a sprocket wheel on said auxiliary shaft, a sprocket chain connecting said spur gear with said sprocket wheel, a cam wheel on said shaft, pins on said cam wheel at various distances from the center, and along radial lines in the face, of said cam wheel, a cam faced plate adapted to be engaged by said pins, a thrust rod on which said cam faced plate is secured, said second rotatable shaft being reciprocably mounted, and a link pivotally mounted and connecting said thrust rod with said second rotatable shaft so as to reciprocate said second rotatable shaft by the actuation of said cam wheel and thereby to select any one of said change-speed gears and to lock them to said interior shaft.

11. The combination in a power driven turret lathe with a reciprocating rotatable turret, a rotary spindle, and driving means for said rotatable spindle, of a change-speed mechanism connected to said driving means, a rack on said turret in the line of the path of reciprocation of said turret, a spur gear in mesh therewith, an auxiliary shaft, a sprocket wheel on said auxiliary shaft, a sprocket chain connecting said spur gear with said sprocket wheel, a cam wheel on said shaft, and means for connecting said cam wheel to rotate only when said turret is returning in its reciprocation, said change-speed mechanism being connected with said cam wheel thereby to be actuated to change the speed of said driving means.

12. The combination in a power driven turret lathe with a reciprocating rotatable turret, a rotary spindle, driving means for said rotary spindle, of a change-speed mechanism connected to control the speed of said driving means, a rack on said turret in the line of the path of movement of reciprocation of said turret, and gear connections actuated by said rack, said gear connections being connected to actuate said change-speed mechanism whenever such gear connections are actuated by said rack, thereby to change the speed of said driving means.

HERBERT KIENZLE.

Witnesses:
H. D. PENNEY,
J. F. V. CHRISTOPHER.